(12) United States Patent
Hagiwara et al.

(10) Patent No.: US 8,476,542 B2
(45) Date of Patent: Jul. 2, 2013

(54) INPUT DEVICE

(75) Inventors: Yasuji Hagiwara, Fukushima-ken (JP); Hayato Hosoya, Fukushima-ken (JP); Hirofumi Niitsuma, Fukushima-ken (JP); Kazunori Nakano, Fukushima-ken (JP)

(73) Assignee: Alps Electric Co., Ltd., Seoul (KR)

( * ) Notice: Subject to any disclaimer, the term of this patent is extended or adjusted under 35 U.S.C. 154(b) by 856 days.

(21) Appl. No.: 12/048,410

(22) Filed: Mar. 14, 2008

(65) Prior Publication Data

US 2008/0223706 A1 Sep. 18, 2008

(30) Foreign Application Priority Data

Mar. 15, 2007 (JP) ................................. 2007-066527

(51) Int. Cl.
*H01H 13/70* (2006.01)
*H01H 25/00* (2006.01)
*H01H 25/04* (2006.01)

(52) U.S. Cl.
USPC ............................ 200/5 R; 200/600; 345/173

(58) Field of Classification Search
USPC ....................................................... 200/5 R
See application file for complete search history.

(56) References Cited

U.S. PATENT DOCUMENTS

| | | | | |
|---|---|---|---|---|
| 4,125,783 A | * | 11/1978 | Sefton | 307/116 |
| 5,790,106 A | | 8/1998 | Hirano et al. | |
| 7,279,647 B2 | * | 10/2007 | Philipp | 200/5 R |
| 7,460,050 B2 | * | 12/2008 | Alvarado et al. | 341/176 |
| 2003/0030628 A1 | | 2/2003 | Sato et al. | |
| 2009/0057124 A1 | * | 3/2009 | Orsley et al. | 200/600 |

* cited by examiner

*Primary Examiner* — R S Luebke
*Assistant Examiner* — Lheiren Mae Caroc
(74) *Attorney, Agent, or Firm* — Brinks Hofer Gilson & Lione (57) ABSTRACT

A flat-type input unit capable of outputting information regarding a position where a finger touches as coordinate data is provided in a casing of an input device. A main-switch unit and sub-switch units operated by the flat-type input unit are also provided in the casing. When ON output signals are simultaneously supplied from the main-switch unit and one of the sub-switch units, the flat-type input unit determines a position where the finger touches by performing a detection operation. It can be determined on the basis of the position whether the main-switch unit or the sub-switch unit is controlled. Moreover, since pressing any position of the flat-type input unit can cause the main-switch unit to supply an ON output signal, a confirmation input can be performed easily with the ON output signal supplied from the main-switch unit.

4 Claims, 6 Drawing Sheets

INPUT DEVICE

CLAIM OF PRIORITY

This application claims benefit of the Japanese Patent Application No. 2007-066527 filed on Mar. 15, 2007, which is hereby incorporated in its entirety by reference.

BACKGROUND OF THE INVENTION

1. Field of the Invention

The present invention relates to an input device including a flat-type input unit capable of detecting a position where a control object has approached on the basis of changes in an electrostatic field between electrodes, and a switch unit for producing an ON/OFF output signal.

2. Description of the Related Art

For a personal computer, as an input device used to input coordinate data for moving a cursor displayed on a screen, there is an input device, other than an input device called a mouse, called a flat-type input device that utilizes changes in capacitance.

In such a flat-type input device, a plurality of X electrodes face a plurality of Y electrodes, and an insulating layer is provided between the X electrodes and the Y electrodes. The X electrodes and the Y electrodes are arranged in a matrix. When an X electrode is selected and a voltage is applied between the selected X electrode and the corresponding Y electrode, the rising edge of this voltage changes with the electrostatic field between the selected X electrode and the corresponding Y electrode. If a finger, which is conductive, is placed near the selected X electrode, a capacitance is formed between the finger and the selected X electrode. Thus, the rising edge of the voltage between the X electrode, close to which the finger is placed, and its corresponding Y electrode varies in response to changes in the electrostatic field. By detecting the variations of the rising edge of the voltage, it can be determined what part of the flat-type input device is being controlled.

A flat-type input device of this type is mainly mounted in a keyboard apparatus of a personal computer. If a finger moves over a surface of the input device, for example, certain data for moving a cursor displayed on a screen is input.

Japanese Unexamined Patent Application Publication No. 2002-123363 discloses a small-sized portable apparatus in which the flat-type input device described above is mounted and a plurality of switching mechanisms are provided at a back side of the flat-type input device. When a specific area of this flat-type input device is pressed and the shape of the part of the flat-type input device is altered, the input device causes a corresponding one of the switching mechanisms to operate. In this input device, coordinate data following the moving path of the finger can be input by moving the finger over the screen of the flat-type input device. A switch signal can also be input by pressing one of the switch mechanisms.

However, in this apparatus, the flat-type input device and the switching mechanisms are used in combination; therefore, when a plurality of switching mechanisms are pressed simultaneously, it is difficult to determine which output signal deserves a higher priority among output signals supplied from the switching mechanisms.

The coordinate data is output by moving a finger over the screen of the flat-type input device, and a program indicated on the screen is selected. Afterwards, if a confirmation operation regarding the program is performed in response to a switch signal supplied from the switching mechanism located at the position related to the coordinate data, only the switching mechanism has to be properly operated. However, since the switching mechanisms are arranged on the same surface and operated independently from each other, a wrong switching mechanism may be pressed and unexpected operation may be performed when the confirmation operation regarding the program is attempted.

SUMMARY

An input device includes a flat-type input unit having a plurality of electrodes and capable of detecting a position specified by a control object on the basis of a change in capacitance that occurs when the control object touches the flat-type input unit. A main switch unit is disposed at a certain position such that the main switch unit is switched to be in a detected state when a part of an input area of the flat-type input unit is pressed. A sub-switch unit is disposed at a certain position such that the sub-switch unit is switched to be in a detected state when a specific part of the input area is pressed. A control unit is provided that determines the position specified by the control object on the basis of the change in capacitance of the flat-type input unit when both of the main switch unit and the sub-switch unit are switched to be in the detected states, and treats, if the position specified is determined to be in the specific part, a detection output signal supplied from the sub-switch unit as a valid signal, and treats, if the position specified is determined to be in a part other than the specific part, a detection output signal supplied from the main switch unit as a valid signal.

DESCRIPTION OF THE EMBODIMENTS

Figure 1:
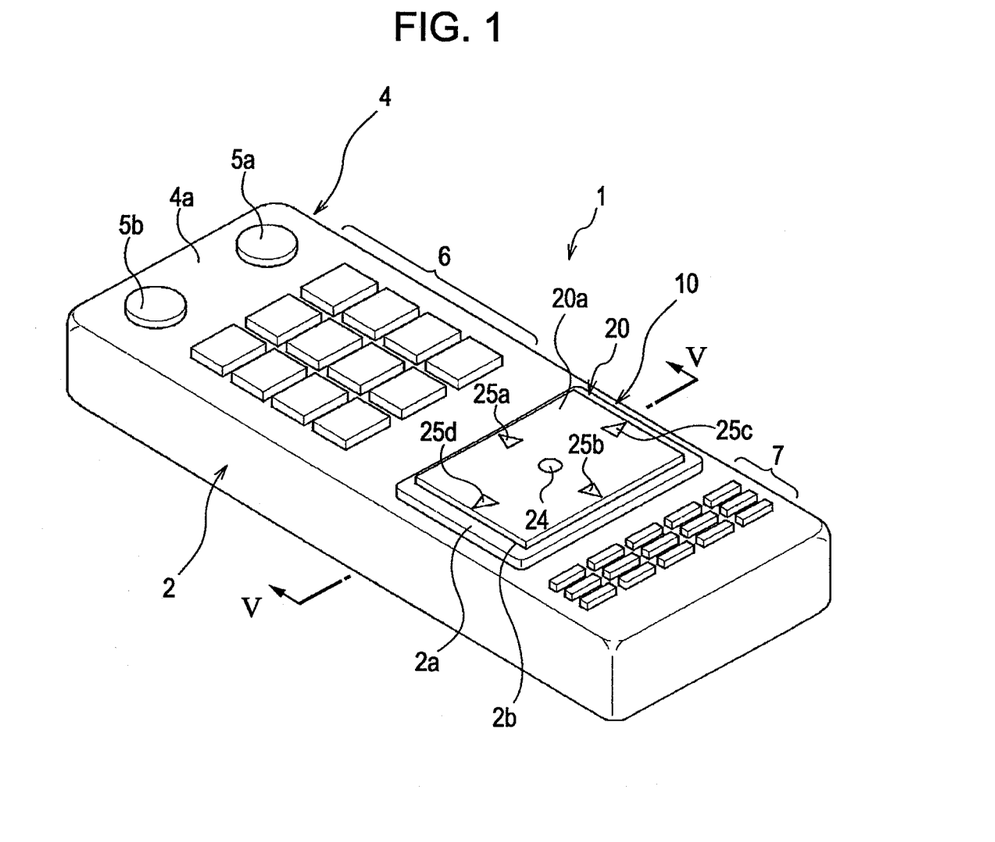
FIG. 1 is a perspective view showing an input device according to an embodiment.
Figure 2:
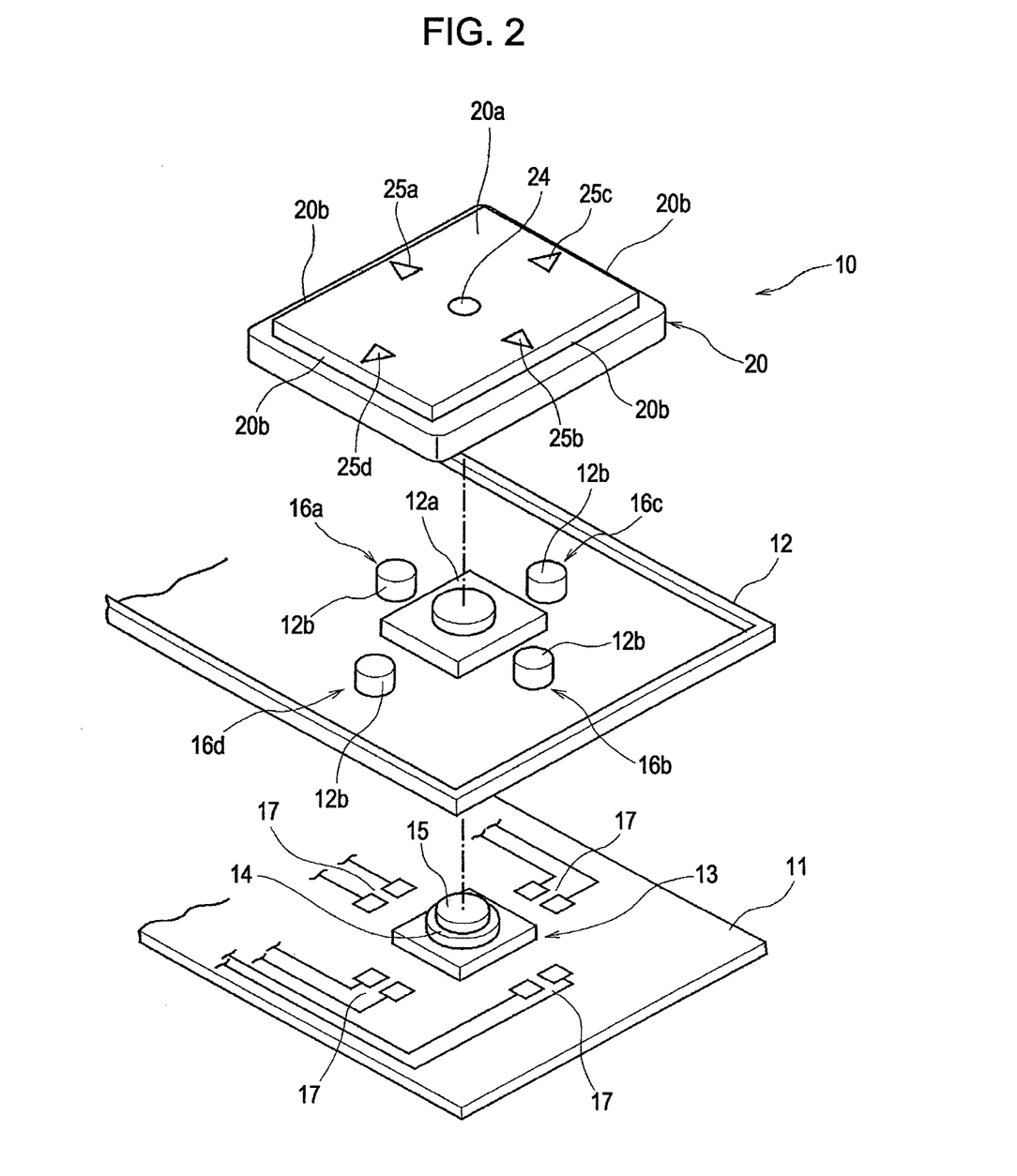
FIG. 2 is an exploded perspective view showing a part of an internal structure of the input device.
Figure 3:
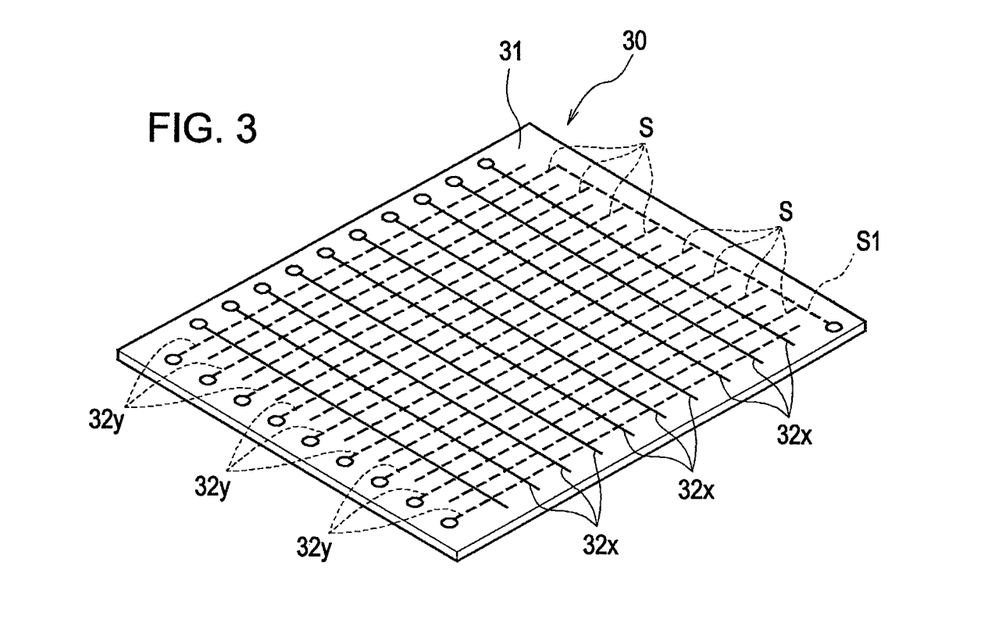
FIG. 3 is a perspective view showing a sensor board provided inside a flat-type input unit.
Figure 4:
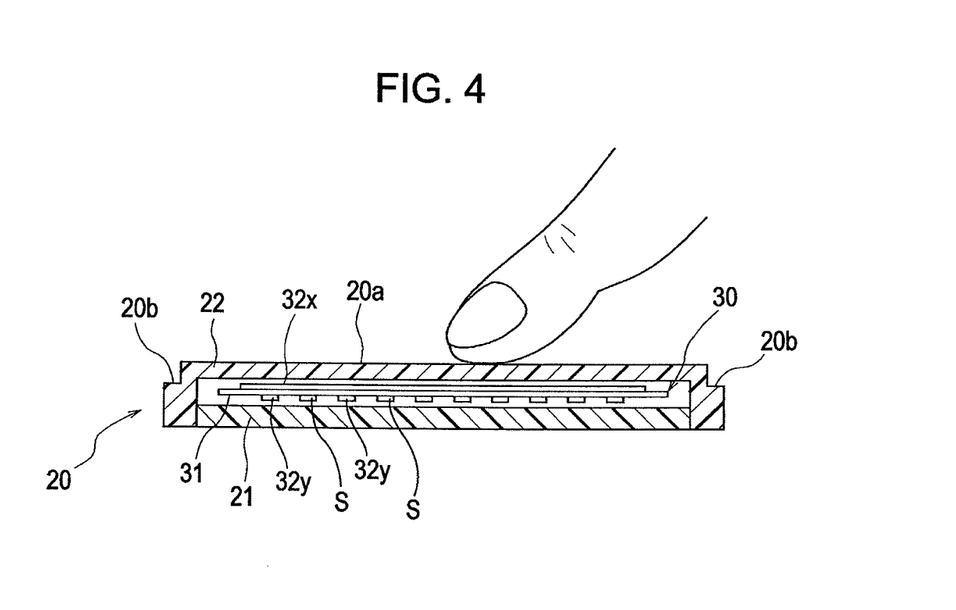
FIG. 4 is a sectional view showing an internal structure of the flat-type input unit.
Figure 5A:
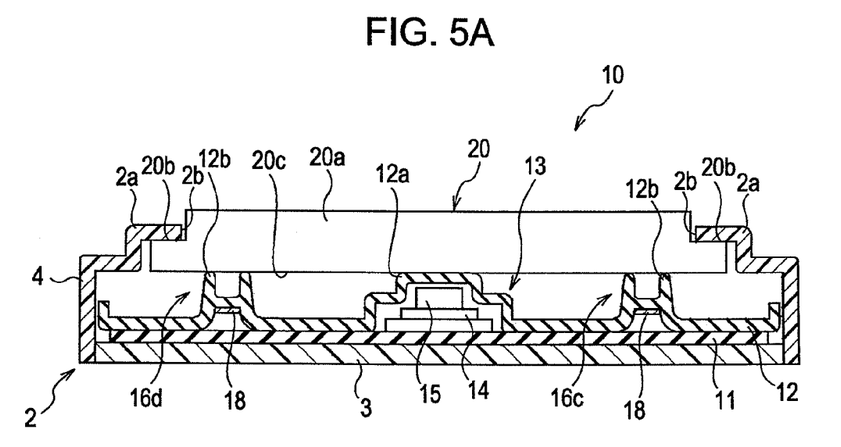
FIGS. 5A and 5B are sectional views showing operating states of the input device.
Figure 5B:
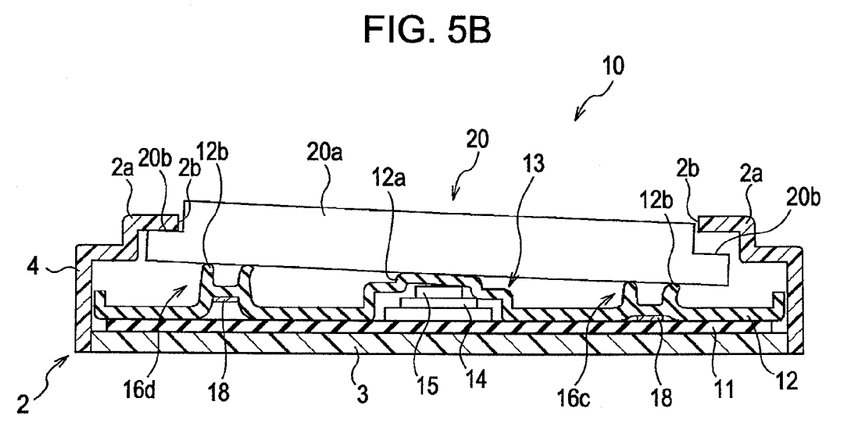
Figure 6A:
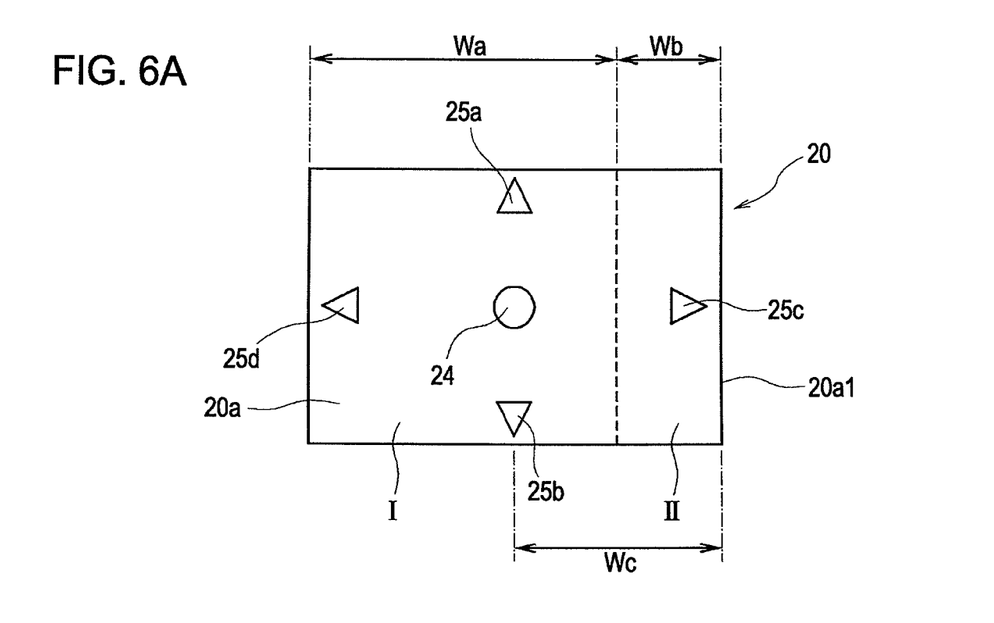
FIGS. 6A and 6B are schematic diagrams used to describe a first operation mode.
Figure 6B:
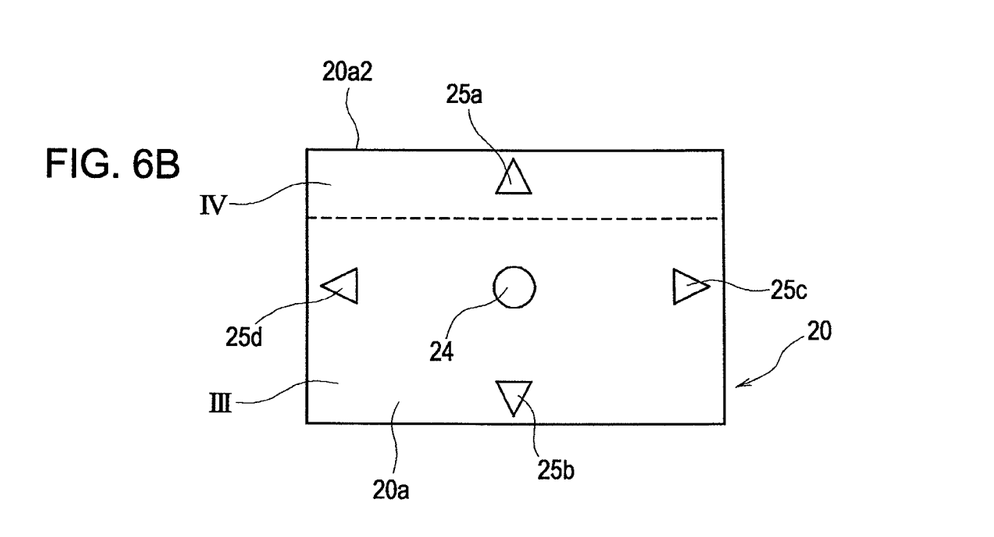
Figure 7:
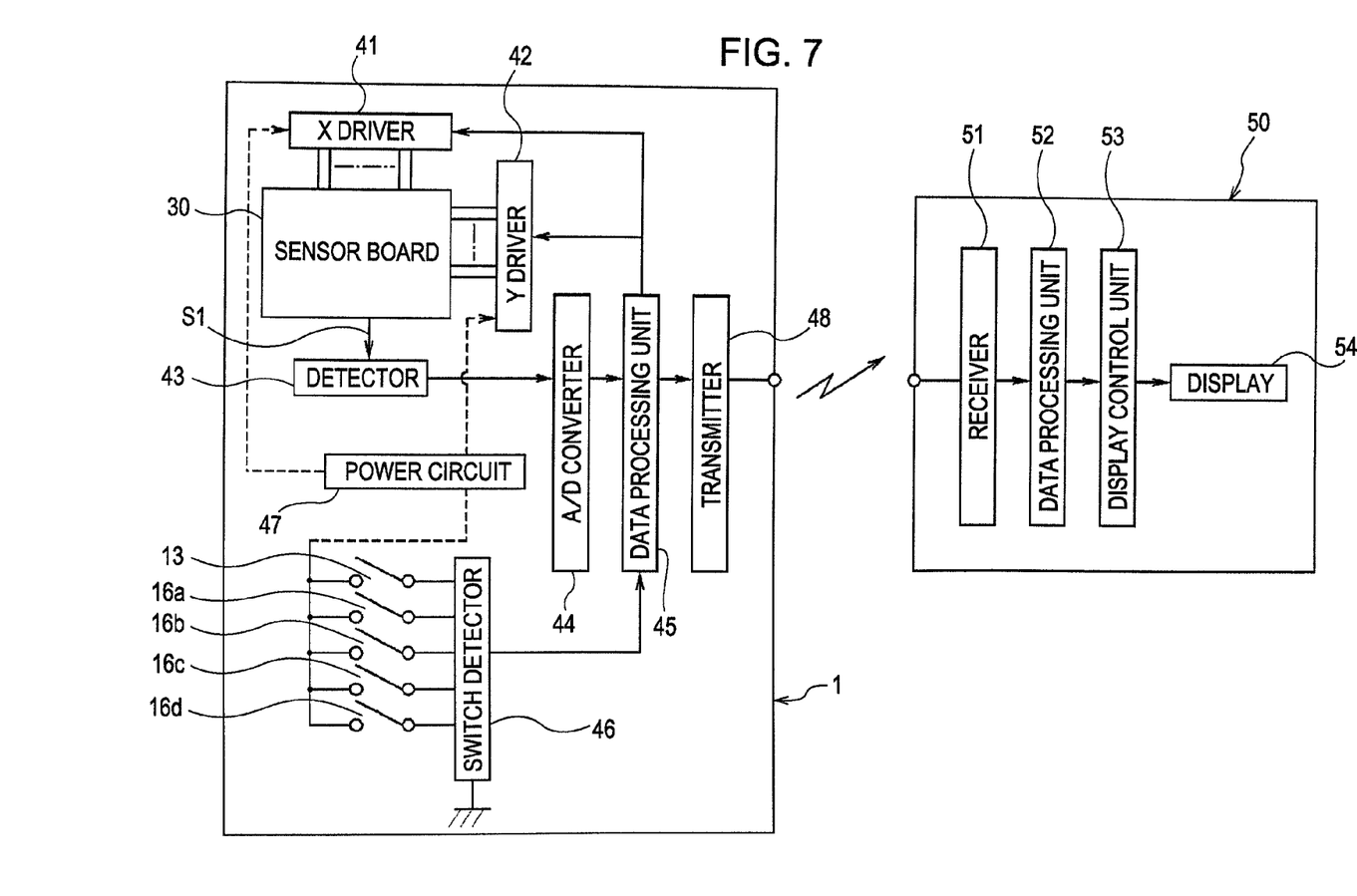
FIG. 7 is a schematic block diagram showing circuits.

FIG. 1 is a perspective view showing an exterior of an input device 1 according to an embodiment. FIG. 2 is an exploded perspective view showing a part of the input device 1. FIGS. 3 and 4 are schematic diagrams used to describe a flat-type input unit. FIGS. 5A and 5B are sectional views of the input device 1 taken along line V-V of FIG. 1, showing different operating states. FIGS. 6A and 6B are schematic diagrams showing allocation of a specific part. FIG. 7 is a schematic block diagram showing circuits.

The input device 1 shown in FIG. 1 is a remote controller used to supply a control signal to a corresponding apparatus via infrared communication or high-frequency communication.

The input device 1 includes a casing 2 having a rectangular-parallelepiped shape. The casing 2 is composed of an insulative synthetic resin, and includes a back panel 3 (see FIGS. 5A and 5B) for covering a back side of the input device 1 and a body casing 4 for integrally covering all sides except the back side.

As shown in FIG. 1, the top surface of the body casing 4 of the casing 2 is an operation surface 4a. A power button 5a and a mode-switching button 5b are provided on the operation surface 4a. A switch mechanism operated by the power button 5a and a switch mechanism operated by the mode-switching button 5b are provided inside the casing 2. In addition, a group of buttons 6 regularly arranged and a group of buttons 7 regularly arranged are provided on the operation surface 4a. Switching mechanisms each operated by a corresponding one of the buttons 6 and switching mechanisms each operated by a corresponding one of the buttons 7 are provided inside the casing 2.

A complex input part 10 is provided between the buttons 6 and the buttons 7 on the operation surface 4a.

As shown in FIGS. 2, 5A, and 5B, the complex input part 10 includes a substrate 11 composed of an insulative plate material with high stiffness, a rubber sheet 12 that is insulative and overlies the substrate 11, and a flat-type input unit 20 stacked on the rubber sheet 12.

The complex input part 10 includes a main-switch unit 13. The main-switch unit 13 includes a switch mechanism 14 fixed on the substrate 11, and a main convex portion 12a formed of the rubber sheet 12 covering the switch mechanism 14 as shown in FIGS. 5A and 5B. A cylindrical operation button 15 projects from the switch mechanism 14. A dome-shaped metal sheet is provided inside the switch mechanism 14, and maintains the cylindrical operation button 15 in its projecting direction. When the cylindrical operation button 15 is pressed, the dome-shaped metal sheet bows inward at the center and electrically connects contacts. When the cylindrical operation button 15 is pressed by a finger from above the main convex portion 12a of the rubber sheet 12, a reaction force generated by pressing can be felt through the finger, and the feel of switching (the feel of a click) is provided to the finger when the contacts are connected.

There are four sub-switch units 16 around the main-switch unit 13. The four sub-switch units 16 are a first sub-switch unit 16a, a second sub-switch unit 16b, a third sub-switch unit 16c, and a fourth sub-switch unit 16d. The first sub-switch unit 16a and the second sub-switch unit 16b are arranged to have the main-switch unit 13 therebetween along a lengthwise direction or front-back direction of the casing 2. The third sub-switch unit 16c and the fourth sub-switch unit 16d are arranged to have the main-switch unit 13 therebetween along a widthwise direction or right-left direction of the casing 2.

As shown in FIG. 2, for each of the sub-switch units 16, a pair of electrodes 17 are formed on the substrate 11 by patterning by using a conductive material layer. For each of the sub-switch units 16, a sub-convex portion 12b is integrally formed with the rubber sheet 12. As shown in FIGS. 5A and 5B, sub-convex portions 12b can be pressed, and their original shapes can be restored by their elastic force. For each of the sub-convex portions 12b, a movable contact portion 18 is fixed at a position facing its corresponding pair of electrodes 17. The movable contact portion 18 is formed of conductive rubber including many conductive filler particles.

At each of the sub-switch units 16, when a corresponding sub-convex portion 12b of the rubber sheet 12 is pressed, a corresponding movable contact portion 18 simultaneously contacts its corresponding pair of electrodes 17. As a result, a detection output signal (an ON output signal) is supplied from the sub-switch unit 16. If the pressing of the sub-convex portion 12b is stopped, the sub-convex portion 12b is restored into a projecting shape by the elastic force of rubber. Thus, the corresponding movable contact portion 18 is moved away from its corresponding pair of electrodes 17, and a non-detection output signal (an OFF output signal) is supplied from the sub-switch unit 16.

As shown in FIG. 4, the flat-type input unit 20 includes a lower casing portion 21 formed of an insulative resin and an upper casing portion 22 formed of an insulative resin. The flat-type input unit 20 has a rectangular-parallelepiped shape formed by combining the lower casing portion 21 and the upper casing portion 22. A sensor board 30 is provided between the lower casing portion 21 and the upper casing portion 22. As shown in FIG. 2, the flat-type input unit 20 has step portions 20b extending along four sides thereof, and projects so that a top rectangular surface of the projection defined by the step portions 20b is directed upward. The upward directed top surface is flat and serves as an input area 20a of the flat-type input unit 20.

The input area 20a has a rectangular shape whose sides are longer in a lengthwise direction than in a widthwise direction. A main indication mark 24 in the center of the input area 20a, and sub-indication marks 25a, 25b, 25c, and 25d are provided in the input area 20a. The sub-indication marks 25a and 25b are arranged to have the main indication mark 24 therebetween along the widthwise direction or front-back direction. The sub-indication marks 25c and 25d are arranged to have the main indication mark 24 therebetween along the lengthwise direction or right-left direction. The main indication mark 24 has a small circular shape. The sub-indication marks 25a and 25b are formed into arrows directed in the up-down direction. The sub-indication marks 25c and 25d are formed into arrows directed in the right-left direction, respectively. The main indication mark 24 and the sub-indication marks 25a, 25b, 25c, and 25d are formed of very low protuberances provided on the surface of the upper casing portion 22 in the input area 20a. The main indication mark 24 and the sub-indication marks 25a, 25b, 25c, and 25d may be formed by printing or coating means on the surface of the upper casing portion 22.

In the flat-type input unit 20, a driving circuit board on which an X driver 41 and a Y driver 42 shown in FIG. 7 are implemented is provided under the sensor board 30 in the lower casing portion 21 and the upper casing portion 22. The driving circuit board is connected to the sensor board 30 in the lower casing portion 21 and the upper casing portion 22, and a flexible cable connected to the driving circuit board extends to outside the lower casing portion 21 and the upper casing portion 22. As a result, the flat-type input unit 20 serves as a component unit, and can easily be implemented inside the casing 2.

As shown in FIGS. 1, 5A, and 5B, a frame unit 2a having a rectangular shape is integrally formed with and projects from the operation surface 4a of the body casing 4 of the casing 2, and an opening 2b having a rectangular shape is defined by the frame unit 2a. As shown in FIGS. 5A and 5B, the flat-type input unit 20 is inserted into the body casing 4 from the back side of the casing 2, the input area 20a is disposed so as to project upward from the opening 2b, and the step portions 20b are flush against the frame unit 2a. In this state, as shown in FIG. 5A, the main convex portion 12a and the four sub-convex portions 12b formed of the rubber sheet 12 are flush against a back surface 20c of the flat-type input unit 20. The elastic force generated by the main convex portion 12a and sub-convex portions 12b causes the flat-type input unit 20 to push upward and the step portions 20b to be pressed against an inner surface of the frame unit 2a.

When the flat-type input unit 20 is housed inside the casing 2, the cylindrical operation button 15 of the main-switch unit 13 is positioned directly below the main indication mark 24.

The sub-convex portions 12b of the sub-switch units 16 are positioned at corresponding positions directly below the sub-indication marks 25a, 25b, 25c, and 25d.

FIG. 3 shows the sensor board 30 housed inside the flat-type input unit 20. The sensor board 30 includes a substrate 31 having a certain area. The substrate 31 is composed of an insulative material having a predetermined dielectric constant. A thin sheet formed of an organic resin material, for example, a polyimide or polyethylene terephthalate (PET), can be used as the substrate 31.

On one surface (an upper surface) of the substrate 31, a plurality of X electrodes 32x are formed so as to extend parallel to each other, and to have a constant pitch. On the other surface (a lower surface) of the substrate 31, a plurality of Y electrodes 32y are formed so as to extend parallel to each other in a direction orthogonal to the X electrodes 32x. A plurality of detection electrodes S are provided on the surface on which the Y electrodes 32y are formed. Each of the detection electrodes S is formed between two Y electrodes 32y positioned next to each other so as to extend parallel to the Y electrodes 32y. The detection electrodes S are connected to a common signal line S1.

The X electrodes 32x, the Y electrodes 32y, and the detection electrodes S are formed of a conductive material with a low resistance, for example, silver or copper. As shown in FIG. 4, a surface of the sensor board 30 (on which the X electrodes 32x are formed) is covered with the upper casing portion 22, which is insulative.

The sensor board 30 has an area approximately equal to the input area 20a of the flat-type input unit 20. No matter what position in almost all the area of the input area 20a is touched by a control object, for example, a finger, the sensor board 30 can detect the position.

As shown in the schematic block diagram showing circuits of FIG. 7, in the input device 1, the X electrodes 32x of the sensor board 30 are connected to the X driver 41, and the Y electrodes 32y are connected to the Y driver 42. The common signal line S1 is connected to a detector 43. Changes in capacitance detected by the detector 43 are converted into digital signals by an analog-to-digital (A/D) converter 44 and the digital signals are supplied to a data processing unit 45 serving as a control unit.

Operating states of the main-switch unit 13 and the sub-switch units 16a, 16b, 16c, and 16d, shown in FIG. 2, are detected by a switch detector 46, and the detected information is supplied to the data processing unit 45. Power is supplied from a power circuit 47 to the X driver 41, the Y driver 42, the main-switch unit 13, and the sub-switch units 16a, 16b, 16c, and 16d.

The data processing unit 45 serving as a control unit generates a control signal on the basis of information supplied from the sensor board 30 and concerning the position specified by a control object, such as a finger, and operation information of the main-switch unit 13 and the sub-switch units 16a, 16b, 16c, and 16d. This control signal is converted into an infrared signal or a high-frequency signal by a transmitter 48, and the transmitter 48 sends the converted control signal to a main apparatus 50.

The main apparatus 50 is, for example, a personal computer or a television set. The main apparatus 50 includes a receiver 51 for receiving and decoding the control signal sent from the transmitter 48 of the input device 1, a data processing unit 52 for analyzing the control signal received, and a display control unit 53 for storing, for example, an operating system and controlling information displayed on a display 54 in response to the control signal.

Next, the operation of the input device 1 will be described.

In the input device 1, if any button among the power button 5a, the mode-switching button 5b, and the buttons 6 and 7 is pressed, the corresponding switch mechanism starts to operate, and the data processing unit 45 shown in FIG. 7 is notified of the operating state of the switch mechanism. The data processing unit 45 generates a control signal in response to a detection output signal of the corresponding switch mechanism and transmits the control signal from the transmitter 48 to the main apparatus 50.

If a finger serving as a conductive control object touches the input area 20a provided on the surface of the flat-type input unit 20, the complex input part 10 can detect a position touched by the finger with the sensor board 30. Moreover, if the flat-type input unit 20 is pressed, detection output signals (ON output signals) can be obtained from the main-switch unit 13 and the sub-switch units 16a, 16b, 16c, and 16d.

On the sensor board 30 of the flat-type input unit 20, a predetermined capacitance is formed between each of the X electrodes 32x and its corresponding detection electrode S provided on the substrate 31, and a predetermined capacitance is also formed between each of the Y electrodes 32y and its corresponding detection electrode S provided on the substrate 31. When a finger, which is conductive, touches the input area 20a, a capacitance is formed between the finger and a corresponding X electrode 32x, and a capacitance is also formed between the finger and a corresponding Y electrode 32y at and around the position touched by the finger. Thus, when the finger is approaching a certain position, the capacitance between an X electrode 32x and its corresponding detection electrode S decreases and the capacitance between a Y electrode 32y and its corresponding detection electrode S also decreases at and near the certain position.

One of the X electrodes 32x provided on the sensor board 30 shown in FIG. 3 is selected in turn by the X driver 41 shown in FIG. 7, and a predetermined electric potential is applied to the selected X electrode 32x. Similarly, one of the Y electrodes 32y is selected in turn by the Y driver 42, and a predetermined electric potential is applied to the selected Y electrode 32y. The X electrodes 32x and the Y electrodes 32y are selected at different times, and thus electric potentials are not simultaneously applied to the X electrodes 32x and the Y electrodes 32y. The timing when the X driver 41 selects one of the X electrodes 32x and the timing when the Y driver 42 selects one of the Y electrodes 32y are controlled by the data processing unit 45.

When an electric potential is applied to the selected X electrode 32x, the other X electrodes 32x are grounded. When an electric potential is applied to the selected X electrode 32x, the electric potential difference generated between the X electrode 32x, to which the electric potential is applied, and the detection electrode S gradually increases in accordance with a predetermined time constant on the basis of the capacitance formed between the X electrode 32x and its corresponding detection electrode S. Here, if a finger, which is conductive, approaches the X electrode 32x to which the electric potential is applied, the capacitance between the X electrode 32x and the detection electrode S decreases because of a capacitance formed between the finger and the X electrode 32x. Moreover, the increasing speed of the electric potential difference between the X electrode 32x and the detection electrode S becomes slower.

The time period required for the electric potential difference to become constant is detected by the detector 43, and the detected data is supplied to the data processing unit 45. The data processing unit 45 determines where a finger is touching in the input area 20a as a position given as coordinates on the basis of information regarding which one of the X electrodes 32x and which one of the Y electrodes 32y are selected and information supplied from the detector 43.

As shown in FIG. 5B, when the input area 20a of the flat-type input unit 20 is pressed by a finger, the flat-type input unit 20 moves downward into the casing 2. This causes the main-switch unit 13 and one of the sub-switch units 16a, 16b, 16c, and 16d to be pressed, and thus the pressed switch units supply detection output signals (ON output signals).

The main-switch unit 13 is located in the center of the flat-type input unit 20, and the sub-switch units 16a, 16b, 16c, and 16d are arranged at four positions around the main-switch unit 13. Thus, if a part indicated by the main indication mark 24 positioned in the center of the input area 20a of the flat-type input unit 20 is pressed vertically downward so as to keep the flat-type input unit 20 in a horizontal position, only the cylindrical operation button 15 of the main-switch unit 13 is pressed. As a result, a detection output signal (an ON output signal) is supplied only from the main-switch unit 13.

However, if a position away from the main indication mark 24 of the input area 20a is pressed, as shown in FIG. 5B, a contacting point between one of the step portions 20b of the flat-type input unit 20 and the inner surface of the frame unit 2a of the casing 2 serves as a pivot, and the flat-type input unit 20 inclines. Thus, the third sub-switch unit 16c positioned under the inclined side of the flat-type input unit 20 is pressed and supplies a detection output signal (an ON output signal). In addition, the main-switch unit 13 is also pressed and supplies a detection output signal (an ON output signal).

That is, when the flat-type input unit 20 is firmly pressed by a finger, regardless of what part of the flat-type input unit 20 is pressed, a detection output signal (an ON output signal) is always supplied from the main-switch unit 13. Unless the center of the input area 20a is properly pressed, a detection output signal (an ON output signal) is supplied from one of the sub-switch units 16 positioned closest to the part pressed by a finger. Therefore, in most cases, when the input area 20a is pressed by a finger, detection output signals (ON output signals) are simultaneously supplied from the main-switch unit 13 and one of the sub-switch units 16.

In the input device 1, one of two operation modes is set by controlling the mode-switching button 5b.

First Operation Mode

In a first operation mode, one of the sub-switch units 16 is operated in order to perform a direction-key input operation. Normally, a selection-input operation is performed by inputting a direction key. In the first operation mode, after such a selection-input operation is performed, a confirmation-input operation can be performed by the main-switch unit 13. In the selection-input operation performed by inputting the direction key by using the sub-switch units 16, one of icons indicating menus displayed on the display 54 can be highlighted and selected, or one of preview screens showing video content displayed on the display 54 can be highlighted and selected. Alternatively, an operation for selecting one of the icons displayed can be performed by moving a cursor displayed on the display 54.

In this selection-input operation, if a finger presses the sub-indication mark 25a shown in FIG. 1, a piece of information is selected in an upward direction in sequence among pieces of information shown on the display 54. If the sub-indication mark 25b is pressed, a piece of information is selected downward in sequence among the pieces of information shown on the display 54. If the sub-indication mark 25c is pressed, a piece of information is selected in a direction to the observer's right in sequence among the pieces of information shown on the display 54. If the sub-indication mark 25d is pressed, a piece of information is selected in a direction to the observer's left in sequence among the pieces of information shown on the display 54.

After one of the menus or screens is selected by performing the selection-input operation, pressing a position near the main indication mark 24 in the input area 20a causes a confirmation-input operation regarding the selected menu or screen to be performed.

However, in the complex input part 10, when the input area 20a is pressed by a finger, as shown in FIG. 5B, the main-switch unit 13 and one of the sub-switch units 16 are usually operated at the same time and detection output signals (ON output signals) are supplied from both the main-switch unit 13 and the one of the sub-switch units 16. Thus, the data processing unit 45 performs the following identification operation by using not only an output signal supplied from the switch detector 46 but also a signal indicating positional coordinates supplied from the detector 43.

For example, when detection output signals (ON output signals) are supplied from both of the main-switch unit 13 and the third sub-switch unit 16c, the data processing unit 45 determines what position in the input area 20a of the flat-type input unit 20 a finger touches on the basis of the signal indicating positional coordinates supplied from the detector 43. The data processing unit 45 determines which one of two areas I and II shown in FIG. 6A in the input area 20a includes the position where the finger touches. The area II is a specific part, and includes the sub-indication mark 25c positioned directly above the third sub-switch unit 16c from which a detection output signal (an ON output signal) is supplied. The area II has a constant width of Wb from a right edge 20a1 of the input area 20a in a direction toward the center. Note that the area II does not include the main indication mark 24 and the other sub-indication marks 25a, 25b, and 25d.

It is desirable that the width of Wb regarding the area II falls within a range of 20% through 80% of Wc, which is half the width of the input area 20a. The area I corresponds to the portion of the input area 20a remaining after excluding the area II.

When detection output signals (ON output signals) are supplied from both the main-switch unit 13 and the third sub-switch unit 16c, if the data processing unit 45 determines that the area II is touched by a finger, the data processing unit 45 treats the detection output signal supplied from the third sub-switch unit 16c as a valid signal and the detection output signal supplied from the main-switch unit 13 as an invalid signal. As a result, the data processing unit 45 determines that a direction-key input operation is performed. Here, a control signal for selecting, in sequence, one of the menus or screens displayed on the display 54 in a direction to the observer's right is generated and sent to the main apparatus 50.

When detection output signals (ON output signals) are supplied from both the main-switch unit 13 and the third sub-switch unit 16c, if the data processing unit 45 determines that the area I is touched by a finger, the data processing unit 45 treats the detection output signal supplied from the main-switch unit 13 as a valid signal and the detection output signal supplied from the third sub-switch unit 16c as an invalid signal. As a result, the data processing unit 45 determines that a confirmation-input operation is performed. Here, a control signal for confirming and executing a selected menu or screen displayed on the display 54 is generated and sent to the main apparatus 50.

When detection output signals (ON output signals) are supplied from both the main-switch unit 13 and the first sub-switch unit 16a, as shown in FIG. 6B, the input area 20a is divided into an area III and a specific part IV. The area IV includes the sub-indication mark 25a positioned directly above the first sub-switch unit 16a, has a constant width from a front edge 20a2 of the input area 20a, and does not include the main indication mark 24 and the other sub-indication marks 25b, 25c, and 25d. The portion of the input area 20a remaining after excluding the area III corresponds to the area IV.

When detection output signals (ON output signals) are supplied from the main-switch unit 13 and the first sub-switch unit 16a, the data processing unit 45 determines which one of the areas III and IV shown in FIG. 6B includes the position where the finger touches on the basis of the output signal supplied from the detector 43. If the data processing unit 45 determines that the area IV is touched by a finger, the data processing unit 45 treats the detection output signal (the ON output signal) supplied from the first sub-switch unit 16a as a valid signal and the detection output signal (the ON output signal) supplied from the main-switch unit 13 is ignored. As a result, the data processing unit 45 generates a control signal for selecting, in sequence, one of pieces of information displayed on the display 54 in an upward direction. If the data processing unit 45 determines that the area III is touched by a finger, the data processing unit 45 treats the detection output signal (the ON output signal) supplied from the main-switch unit 13 as a valid signal and the detection output signal (the ON output signal) supplied from first sub-switch unit 16a is ignored. As a result, the data processing unit 45 generates a control signal for confirming a selected menu or screen.

The above-described control operation is performed in the same way when detection output signals (ON output signals) are supplied from both the main-switch unit 13 and the second sub-switch unit 16b and when detection output signals (ON output signals) are supplied from both the main-switch unit 13 and the fourth sub-switch unit 16d.

Second Operation Mode

If a second operation mode is set by pressing the mode-switching button 5b, the data processing unit 45 generates a control signal by using the positional coordinate data detected by the sensor board 30 provided in the flat-type input unit 20 and the detection output signal supplied from the main-switch unit 13, and ignores all detection output signals supplied from the sub-switch units 16.

If the finger touching the input area 20a of the flat-type input unit 20 moves within the input area 20a, positional coordinate data corresponding to the position to which the finger has moved is supplied from the detector 43 to the data processing unit 45. One of the icons indicating menus or one of the preview screens showing video content displayed on the display 54 is highlighted and selected by the data processing unit 45 on the basis of this positional coordinate data. Alternatively, an operation for selecting one of the icons displayed is performed by moving a cursor displayed on the display 54. Alternatively, a control signal used to input a character, a number, or a symbol in response to the moving path of the finger in the input area 20a is generated.

When the above-described selection-input operation is performed, or when a drawing path for, for example, a character or a number is input, if the input area 20a is pressed by a finger and a detection output signal (an ON output signal) is supplied from the main-switch unit 13, the data processing unit 45 generates a control signal for confirming a selected menu or a control signal for confirming, for example, a character or a number that is input, and sends the control signal to the main apparatus 50.

As shown in FIG. 5B, pressing any position in the input area 20a can cause the main-switch unit 13 to supply a detection output signal (an ON output signal). Thus, after a finger moves to a certain position in the input area 20a, such a detection output signal (such an ON output signal) can be supplied from the main-switch unit 13, without moving the finger back to the center of the input area 20a, shortly after the certain position on the input area 20a is pressed.

That is, in the second operation mode, the complex input part 10 is designed such that pressing the position where the finger touches, no matter where the position is located in the input area 20a, causes the main-switch unit 13 to perform a confirmation-input operation. As a result, in the first operation mode, when one of the sub-switch units 16 is operated, not only the one of the sub-switch units 16 but also the main-switch unit 13 is operated. Thus, in the first operation mode, as shown in FIGS. 6A and 6B, specifying an area where the finger touches in the flat-type input unit 20 allows determination of whether one of the sub-switch units 16 is to be controlled or the main-switch unit 13 is to be controlled.

The input device according to the embodiment is a remote controller; however, such an input device may be provided in a control unit of a portable device such as a cellular phone.

What is claimed is:

1. An input device comprising:
a flat-type input unit having a plurality of electrodes and capable of detecting a position of a control object on the basis of a change in capacitance that occurs when the control object touches the flat-type input unit;
a mode-switching button configured to switch between a first operation mode and a second operation mode;
a main switch unit disposed immediately below a center of an input area;
a plurality of sub-switch units disposed around the main switch unit, the main switch unit and the plurality of sub-switch units disposed in the area of the flat-type input unit in a plan view such that one of the plurality of sub-switch units will switch over when any part of the input area is pressed, except that none of the plurality of sub-switch units will switch over when only the center of the input area is pressed;
a control unit configured to determine a position of the control object on the basis of the change in capacitance of the flat-type input unit when the main switch unit and the sub-switch unit are switched to be in the detected states;
wherein when in the first operation mode, a detection signal supplied from the main switch unit is treated as a valid signal and a detection signal supplied from any sub-switch unit is treated as an invalid signal, if the control object is determined to be in a first part of the input area, wherein the first part of the input area is not proximate to the corresponding sub-switch unit supplying the detected signal;
wherein when in the first operation mode, a detection signal supplied from a sub-switch unit is treated as a valid signal and a detection signal supplied from a main switch unit is treated as an invalid signal, if the control object is determined to be in a second part of the input area, wherein the second part of the input area is proximate to the corresponding sub-switch unit supplying the detected signal; and
wherein when in the second operation mode, when both the main switch unit and the sub-switch unit are switched to the detected states, only the detection output signal supplied from the main switch unit is treated as a valid signal regardless of the detected position of the control object.

2. The input device according to claim 1, wherein in the first operation mode, the detection output signal supplied from the main switch unit or the detection output signal supplied from the sub-switch unit is output as a control signal, and in the second operation mode, coordinate data indicating the position specified by the control object on the flat-type input unit and the detection output signal supplied from the main switch unit are output as control signals.

3. The input device according to claim 2, wherein, in the first operation mode, the detection output signal supplied from the sub-switch unit causes an operation for selecting data to be performed and the detection output signal supplied from the main switch unit causes an operation for confirming the selected data to be performed, and in the second operation mode, an operation for selecting data is performed on the basis of the coordinate data, and the detection output signal supplied from the main switch unit causes an operation for confirming the selected data to be performed.

4. The input device according to claim 1, wherein in the first operation mode, the main-switch unit and the sub-switch units are controlled by respectively touching the first part and the second part, and wherein in the second operation mode, the main-switch unit performs a confirmation-input operation when a control object touches any position in the input area.

* * * * *